(12) United States Patent
Pathikonda et al.

(10) Patent No.: US 11,245,664 B2
(45) Date of Patent: Feb. 8, 2022

(54) CONVEYING NETWORK-ADDRESS-TRANSLATION (NAT) RULES IN A NETWORK

(71) Applicant: Cisco Technology, Inc., San Jose, CA (US)

(72) Inventors: Padmanab Pathikonda, Mountain House, CA (US); Rishi Chhibber, Dublin, CA (US); Stig Ingvar Venaas, Oakland, CA (US); Ramakrishnan Chokkanathapuram Sundaram, Fremont, CA (US); Francesco Meo, San Jose, CA (US); Rahul Parameswaran, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/904,301

(22) Filed: Jun. 17, 2020

(65) Prior Publication Data
US 2021/0400017 A1    Dec. 23, 2021

(51) Int. Cl.
*H04L 29/12*    (2006.01)
*H04L 12/721*    (2013.01)
(Continued)

(52) U.S. Cl.
CPC .......... *H04L 61/2557* (2013.01); *H04L 45/32* (2013.01); *H04L 47/806* (2013.01);
(Continued)

(58) Field of Classification Search
CPC . H04L 61/2557; H04L 61/2069; H04L 45/32; H04L 61/256; H04L 61/2503; H04W 40/023; H04W 28/20
See application file for complete search history.

(56) References Cited

U.S. PATENT DOCUMENTS 8,861,340 B1    10/2014 Atlas
9,030,926 B2    5/2015 Han et al.
(Continued)

OTHER PUBLICATIONS

Wijnands et al., PIM Flooding Mechanism (PFM) and Source Discovery (SD), Mar. 2018, Internet Engineering Task Force (IETF), Request for Comments: 8364, 18 pages. (Year: 2018).*
(Continued)

*Primary Examiner* — Brian J. Gillis
*Assistant Examiner* — Chhian (Amy) Ling
(74) *Attorney, Agent, or Firm* — Lee & Hayes, P.C.

(57) ABSTRACT

In one embodiment, a first networking device associated with a switched network comprises one or more processors and one or more computer-readable media storing computer-executable instructions that, when executed, cause the one or more processors to perform acts comprising configuring, on the first networking device, a network-address-translation (NAT) rule indicating that a first multicast group is to be translated to a second multicast group. The acts further include, at least partly in response to the configuring of the NAT rule, storing the NAT rule at the first networking device, generating a message indicating the NAT rule, and sending the message to at least a second networking device associated with the switched network.

20 Claims, 11 Drawing Sheets

(51) Int. Cl.
*H04W 40/02* (2009.01)
*H04W 28/20* (2009.01)
*H04L 12/927* (2013.01)

(52) U.S. Cl.
CPC ...... *H04L 61/2069* (2013.01); *H04L 61/2503* (2013.01); *H04L 61/256* (2013.01); *H04W 28/20* (2013.01); *H04W 40/023* (2013.01)

(56) References Cited

U.S. PATENT DOCUMENTS

| | | | |
|---|---|---|---|
| 9,736,061 B2 | 8/2017 | Csaszar et al. | |
| 2012/0327764 A1* | 12/2012 | Han | H04L 12/185 370/219 |
| 2015/0071055 A1* | 3/2015 | Csaszar | H04L 45/22 370/217 |
| 2017/0085525 A1* | 3/2017 | Zha | H04L 45/66 |
| 2019/0207779 A1* | 7/2019 | Immidi | H04L 12/185 |
| 2021/0144019 A1* | 5/2021 | Kebler | H04L 12/1886 |

OTHER PUBLICATIONS

Eckert, Toerless, Principal Engineer, "Video Transport Architectures," CiscoLive, Jul. 10-14, 2016, Las Vegas, NV, 134 pages.
Junos OS, "Multicast Protocols User Guide," Juniper Networks, Published May 12, 2020, 2,293 pages. (uploaded in 7 parts).

* cited by examiner

CONVEYING NETWORK-ADDRESS-TRANSLATION (NAT) RULES IN A NETWORK

TECHNICAL FIELD

The present disclosure relates generally to techniques for conveying network-address-translation (NAT) rules among devices in a switched network.

BACKGROUND

In today's digital world, more and more user operate client computing devices to consume digital content. Further, much of this content is provided from content sources to respective receiver devices over networks of data centers that house servers, routers, and other networking devices. For example, a source device may send content, such a live video stream, to receiver devices via a networking fabric of switches, routers, and other computer networking devices.

In some instances, a source device, S, may send content to each receiver device that has subscribed to a group of devices, G, such as a multicast group. To subscribe to the group, G, an individual receiver device may send a request to join the specified group to an egress node in the networking fabric. In response to receiving this request, the egress node may reference a flow-policy table that indicates a bandwidth required for sending content from the specified source to the specified group. After determining the required bandwidth, the egress node may reserve that amount of bandwidth on a link between the egress node and an upstream node in the networking fabric. The upstream node, meanwhile, may also receive the join request (in this instance, from the egress node) and may similarly determine the required bandwidth and reserve this amount of bandwidth on a link between itself and another node in the fabric that is still further upstream (i.e., towards the source, S). This may continue until a route has been created between the newly subscribed receiver device and the source device, S.

Thus, when the source device, S, begins broadcasting traffic to the group, G, the nodes in the networking fabric may send the traffic along each generated route towards each respective receiver device, such as along the example multicast route described above. In some instances, however, traffic associated with the source and group (i.e., traffic from the original S, G) may be translated to traffic from a different source and group (i.e., a new S, G). In these instances, the new S, G may require a bandwidth that is different from the bandwidth required by the original S, G. In instances where the new S, G requires a greater bandwidth, the links of the created multicast route towards the receiver device, described above, may end up being oversubscribed, given that these links did not reserve an amount of bandwidth equal to this greater amount required by the new S, G. Thus, traffic across these links may be disrupted and the receiver devices might not receive some or all of the desired traffic.

In order to address this and other shortcomings, the techniques described herein may enable nodes in a networking fabric to determine when an original S, G is translated to a new S, G, such that the nodes may take into account the required bandwidth associated with the new S, G when reserving bandwidth across links of a generated multicast route. By taking into the account the required bandwidth of the new S, G, the techniques thus avoid oversubscribing links in a multicast route, thus lessening traffic loss and disruption in the multicast route.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
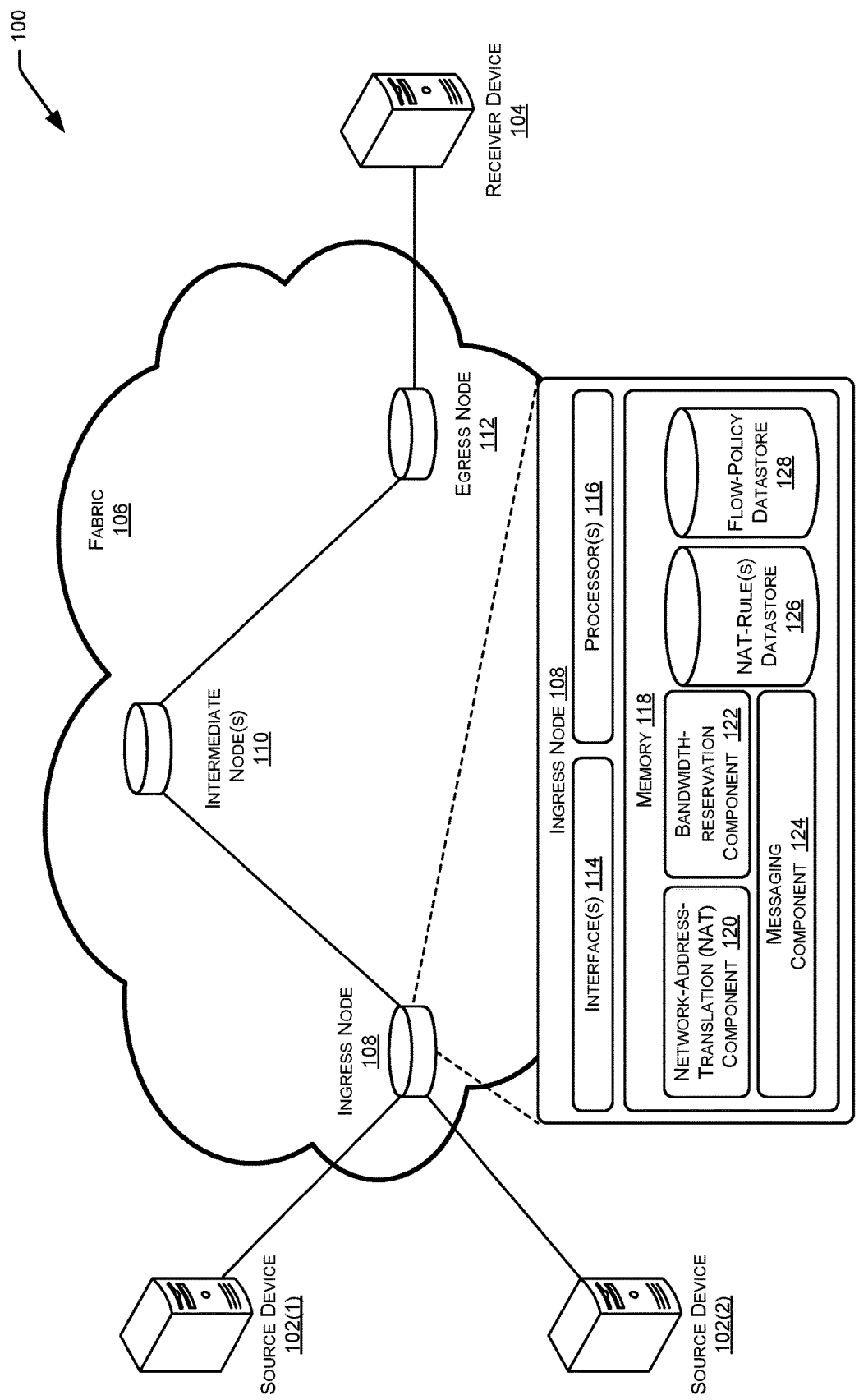
FIG. 1 illustrates a system-architecture diagram of an example environment in which a source device sends multicast traffic towards a receiver device via one or more nodes of a networking fabric. In some instances, each node in the fabric is configured to determine if it has been configured with a network-address-translation (NAT) rule that translates traffic from a first S, G (e.g., S1, G1) to a second S, G (e.g., S2, G2) and, in response, to send messages to each other node in the fabric. For example, the node upon which the NAT rule is configured may send a protocol-independent-multicast-flooding-mechanism (PFM) message indicating the NAT rule to each other node in the fabric. Each node may thus use this information to determine the required bandwidth of S2, G2 for reserving the appropriate amount of bandwidth in response to receiving a join request associated with S1, G1.

This disclosure describes, in part, a first networking device associated with a switched network, the first networking device comprising one or more processors and one or more computer-readable media storing computer-executable instructions that, when executed, cause the one or more processors to perform acts comprising configuring, on the first networking device, a network-address-translation (NAT) rule indicating that a first multicast group is to be translated to a second multicast group. The acts further include, at least partly in response to the configuring of the NAT rule, storing the NAT rule at the first networking device, generating a message indicating the NAT rule, and sending the message to at least a second networking device associated with the switched network.

This disclosure also describes, in part, a method comprising receiving, at a first device in a switched network, an indication of a network-address-translation (NAT) rule indicating that a first multicast group is to be translated to a second multicast group. The method further includes storing the NAT rule at the first device and receiving, from a second device, a request to join the second multicast group. The method also comprises determining, using the NAT rule, that the first multicast group is to be translated to the second multicast group and determining a bandwidth requirement associated with the first multicast group.

This disclosure also describes, in part, a method comprising configuring, on a first-hop-router (FHR) of a switched network, a network-address-translation (NAT) rule indicating that a source of a multicast group is to be translated to first source and to a second source, as well as storing the NAT rule on the FHR. In addition, the method includes generating, by the FHR and at least partly in response to the configuring, a message indicating the NAT rule and sending the message to at least: (i) a first device coupled to the FHR and associated with a first multicast route toward a receiver, and (ii) a second device coupled to the FHR and associated with a second multicast route toward the receiver.

Additionally, the techniques described herein may be performed via methods, devices, and/or non-transitory computer-readable media storing computer-executable instructions that, when executed by one or more processors, performs methods described herein.

EXAMPLE EMBODIMENTS

Typical data-center architectures include interconnected computer networking devices (e.g., switches, routers, etc.) configured to route immense amounts of traffic to other devices in the architecture. This traffic may include multicast traffic or other communications specifying respective identifiers of groups of computing devices. For example, these architectures may route traffic for a specified multicast group from a source to each destination device of a group of destination computing devices. In some instances, each destination device may subscribe to receiving communication from the source by subscribing to a particular internet protocol (IP) address associated with the multicast group, "(S,G)", where S represents the source of the communications and G represents identifier (e.g., IP addresses) of each receiving computing device that has subscribed to the group.

When a source device associated with a particular multicast group sends a packet, the source may initially send the packet to a computing device, or "node" in the network that directly couples to the source device. The node device may then forward along the packet to one or more other nodes in the network, each of which may continue to do the same, such that the packet (or copies thereof) ultimately reach each destination device that has subscribed to receive this multicast traffic.

In order to join such a multicast group, a receiver device may send a join request to a node in the network (e.g., an egress node) to which the receiver device couples. For example, an example receiver device may send a request to join a specified source and group (e.g., S1, G1) to the egress node. As is known, each group may be associated with a particular flow policy indicating a rate at which traffic will be sent from the source to each receiver in the group such that the egress node, and other nodes between the egress node and the source, may reserve the appropriate amount of bandwidth on respective links in the network. For example, envision that the first multicast group (S1, G1) is associated with a first bandwidth, such as 3 GB/s, while a second multicast group (S2, G2) is associated with a second bandwidth, such as 4 GB/s.

Thus, in response to the egress node receiving the request to join the first multicast group, S1, G1, the egress node may reference a flow-policy table stored at the egress node indicating the bandwidth required for this particular group. In this example, the egress node may determine, from the flow-policy table, that the first group, G1, is associated with a data transfer rate of 3 GB/s. Thus, the egress node may identify a link between the egress node and a next-hop upstream node in the network that has at least 3 GB/s available and, after identifying such a link, may reserve the bandwidth equal to 3 GB/s. This upstream node, meanwhile, may similarly receive the join request, may identify the needed bandwidth (e.g., 3 GB/s), may identify an upstream link having this bandwidth, and may reserve this bandwidth. Thus, each node between the receiver and the source, S1, may similarly perform this operation to create a multicast route having the appropriate reserved bandwidth between the source and the receiver. After creating this route, the source may send multicast traffic to the IP addresses associated with the group, G1, including the newly joined receiver. This traffic will make its way along the newly generated route towards the receiver.

In some instances, however, a network-address-translation (NAT) rule may be configured on a node in the network, such as at an ingress node (that couples to the source, S1), the egress node, or otherwise. For example, a NAT rule configured on the ingress node may indicate that traffic from S2, G2 is to be translated into traffic from S1, G1. For example, S1 may represent a first camera (for example) associated with live video stream, while S2 may represent a second camera associated with the live video stream. Thus, when the ingress node receives traffic associated with S2, G2, it may translate this traffic to S1, G1 before sending it downstream in the network toward each receiver that has subscribed to the group, G1.

As noted above, however, the second group, G2, may be associated with a data transfer rate of 4 GB/s, rather than 3 GB/s. Thus, the source, S2, may send data towards the receiver at a rate of 4 GB/s. Similarly, each node in the network may send this data along at a rate of 4 GB/s. However, given that the receivers subscribed to the group, G1, associated with a data transfer rate of 3 GB/s, and given that the nodes only reserved 3 GB/s on each link between the source and the respective receiver, some of these links may be oversubscribed and, thus, traffic loss and disruption may occur. That is, if a link is fully utilized, taking into account the 3 GB/s associated with G1, then sending data along at 4

GB/s may result in the link attempting to handle more data than its capacity. This may result in traffic loss or disruption at the receiver.

In order to avoid this oversubscription—and thus, the traffic loss and disruption—this disclosure describes techniques to convey information regarding NAT rules in a switched network such that nodes in the network may reserve the appropriate amount of bandwidth on links within the network. In some instances, this information is conveyed using a type-length-value (TLV) portion of a protocol-independent-multicast-flooding-mechanism (PFM) message sent from a node on which the NAT rule is configured to each other node in the switched network, as described. Details regarding PFM messages may be found in Internet Engineering Task Force (IETF), Request for Comments (RFC) 8364, which is incorporated herein by reference.

For example, and as described above, a NAT rule may initially have been configured on the example ingress node indicating that the traffic from S2, G2 is to be translated into traffic from S1, G1. In response this NAT rule being configured on the ingress node, this may be configured to send information indicating this NAT rule to one or more other nodes in the network. For example, the ingress node may send, to each other downstream node in the network, a PFM message indicating, via a TLV, of the PFM message, the NAT rule that the traffic from S2, G2 is to be translated into traffic from S1, G1.

Upon receiving this PFM or other message type, each downstream may identify and store the NAT rule. Thereafter, when a receiver requests to join the first group, S1, G1, the node may determine, from the stored NAT rule, that traffic from S2, G2 is to be translated into S1, G1. This node may thus determine, from the flow-policy table, a data transfer rate associated with G2, rather than G1, and may attempt to reserve an upstream bandwidth equal to this data transfer rate. For example, the example egress node from above that receives the request to join S1, G1 may determine, from the flow-policy table it stores, to reserve 4 GB/s rather than 3 GB/s between itself and its upstream, next-hop node. The upstream node may similarly make this determination using the NAT rule it has stored, and so forth. Thus, a channel having a reserved capacity of 4 GB/s, rather than 3 GB/s may be created between the ingress node and the receiver device. Thus, when the ingress node translates the traffic from S2, G2 into traffic from S1, G1 and sends this downstream at 4 GB/S (rather than 3 GB/s), each link may be able to handle the traffic, rather than run the risk of being oversubscribed. Further, while the above example describes configuring the NAT rule on an ingress node, it is to be appreciated that the techniques may apply equally when the NAT rule is configured on an intermediate node, an egress node, multiple bridge nodes, and/or the like.

In another example, a PFM or other message may be used to convey information regarding a NAT rule in order to automatically configured a topology-independent-multicast-only-fast-re-route (TI-MoFRR) redundant fabric. For example, in some instance, such as video-over-IP deployments, there is a need to add application reliability against network failures, such as link failures, node failures, and the like. Thus, TI-MoFRR may be utilized to handle network failures without undue downtime.

The techniques described herein may enable TI-MoFRR automatically and without manual configuration of certain rules on each node within a switched network. For example, envision a scenario where a source, S, couples to a first-hop-router (FHR), on which a NAT rule has been configured to duplicate and translate the traffic into traffic from a first source, S1, and traffic from a second source, S2. After receiving traffic from the source, S, the FHR may (according to the NAT rule) duplicate and translate the traffic, before sending the traffic from S1 along a first network path or plane (e.g., to a first intermediate-hop-router (IHR)) and the traffic from S2 along a second network path or plane (e.g., to a second IHR). These respective IHRs may continue to send along the respective traffic, until each of the traffic reaches a last-hop-router (LHR), which couples to a receiver device that has subscribed to receive the traffic from S, G.

In addition to duplicating and translating this traffic, however, the FHR may send messages to other nodes in the network, including the LHR, indicating the NAT rule. For example, upon the NAT rule being configured on the FHR, the FHR may be configured to automatically send, to downstream nodes, one or more messages indicating the NAT rule. For example, the FHR may send, to each downstream node, a PFM message indicating that traffic from S is to be translated into traffic from S1 and traffic from S2. The LHR may thus receive this PFM message and store the NAT rule.

Thus, upon receiving the traffic from S1 via the first network plane and the traffic from S2 via the second network plan, the LHR may select one of the streams to send to the receiver as a primary data stream. For example, using the NAT rule, the LHR may determine that each of the traffic from S1 and S2 is associated with the traffic from S and, thus, the LHR may translate one of the streams (e.g., S1) back into traffic from the source, S, and may send this S, G traffic to the receiver. Further, if the traffic from S1 is disrupted, the LHR may switch to translating the traffic from S2 into traffic from S and may begin sending this backup data stream to the receiver.

By sending the information regarding the NAT rule to the LHR (e.g., via the PFM message), the techniques thus enable TI-MoFRR without requiring manual configuration of the network nodes.

FIG. 1 illustrates a system-architecture diagram in which computing devices route traffic, such as multicast traffic, within at least a portion of a network 100. The network 100 may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the network 100 comprises a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

As illustrated, the network 100 may include one or more source server devices, such as devices 102(1) or 102(2), that originate communication(s) that are sent to devices within the network 100, such as to an example receiver 104 via a networking fabric 106. In some instances, the communications comprise unicast communications, broadcast communications, multicast communications, and/or any type of communications originating from a source 102 and addressed to one or more receiving computing devices, such as the example receiver 104. For example, the source device 102 may send communications associated with a specified group of computing devices. In these instances, the communication may comprise a multicast communication that is sent, via devices in the network 100, to each destination device that has subscribed to the multicast group, or "route". As such, the network 100 may receive these communications and forward them along to one or more computer networking devices towards the destination device(s).

In the illustrated example, the source device 102 may couple to an ingress node 108 (e.g., switch, router, or other computing device), which in turn may couple to one or more intermediate nodes 110 (e.g., switches, routers, or other computing devices), which in turn couples to an egress node 112. The egress node 112 may couple to the receiver device 104 that has subscribed to receive communications associated with a multicast group.

As illustrated, the ingress node 108 may include one or more interfaces 114, one or more hardware processors 116 and memory 118, which may store a network-address-translation (NAT) component 120, a bandwidth-reservation component 122, and a messaging component 124, in addition to a NAT-rules datastore 126 and a flow-policy datastore 128. It is to be appreciated that while FIG. 1 illustrates the components of the ingress node 108, each other node of the fabric 106 may include the same or similar components.

The NAT component 120 may enable an administrator or other operator of the fabric 106 to configure a NAT rule on the node, such as the ingress node 108 in this example. For example, the NAT component 120 may enable the administrator to configure to a NAT rule indicating that communications associated with a first multicast group, such as S1, G1 associated with the first source device 102(1), are to be translated to communications associated with a second multicast group, such as S2, G2 associated with the second source device 102(2). In addition, upon the NAT component 120 may be used by the ingress node 120 to receive a request to send traffic associated with S2, G2 and, in response, to send traffic associated with S1, G1.

The messaging component 124, meanwhile, may be configured to send, in response to a NAT rule being configured on the ingress node 108, one or more messages indicating the NAT rule to other nodes, in the fabric 106. For example, the messaging component 124 may send a PFM message indicating the NAT rule to each downstream node in the network, such as the intermediate node(s) 110 and the egress node 112. In response to receiving these PFM or other message types, each respective node may identify the NAT rule from the respective message and store the NAT rule in each node's respective NAT-rule datastore 126.

The bandwidth-reservation component 122, meanwhile, may be configured to reserve the required bandwidth along an upstream link in response to receiving a join request from a receiver, such as the receiver 104. For example, envision that the receiver 104 sends, to the egress node 112, a request to join the multicast group S2, G2. In response to this request, an instance of the bandwidth-reservation component 122 executing on the egress node 112 may first determine the bandwidth required for the multicast group. First, however, the bandwidth-reservation component 122 or the NAT component 120 may determine, from the NAT-rules datastore 126, that traffic from S1, G1 is to be translated into S2, G2. Thus, the bandwidth-reservation component 122 may take this NAT rule into account when determining the amount of bandwidth to reserve on an upstream link.

For example, the bandwidth-reservation component 122 executing on the egress node 112 may reference the flow-policy datastore 128 to determine a flow policy associated with G1 (rather than G2, given that traffic from G1 is to be translated into G2). The bandwidth-reservation component 122 may then attempt to reserve, on a link between the egress node 112 and its upstream intermediate node 110, a bandwidth that is at least equal to the data transfer indicated by the flow policy of G1. The bandwidth-reservation component 122 executing on the egress node 112 may also reserve this amount of bandwidth on a link between the egress node 112 and the receiver device 104.

A bandwidth-reservation component 122 may similarly receive the join request associated with G2, determine (using the received NAT rule) that traffic from G1 is to be translated into G2, and determine a data transfer rate required for G1 from an instance of the flow-policy datastore 126 stored on the intermediate node 110. The bandwidth-reservation component 122 operating on the intermediate node 110 may then attempt to reserve this amount of bandwidth on an upstream link between the intermediate node 110 and the ingress node 108. At this point, a channel between the ingress node 108 and the receiver 104 has been created, with a bandwidth that is at least equal to the bandwidth required by S1, G1, rather than that associated with S2, G2.

Figure 2A:
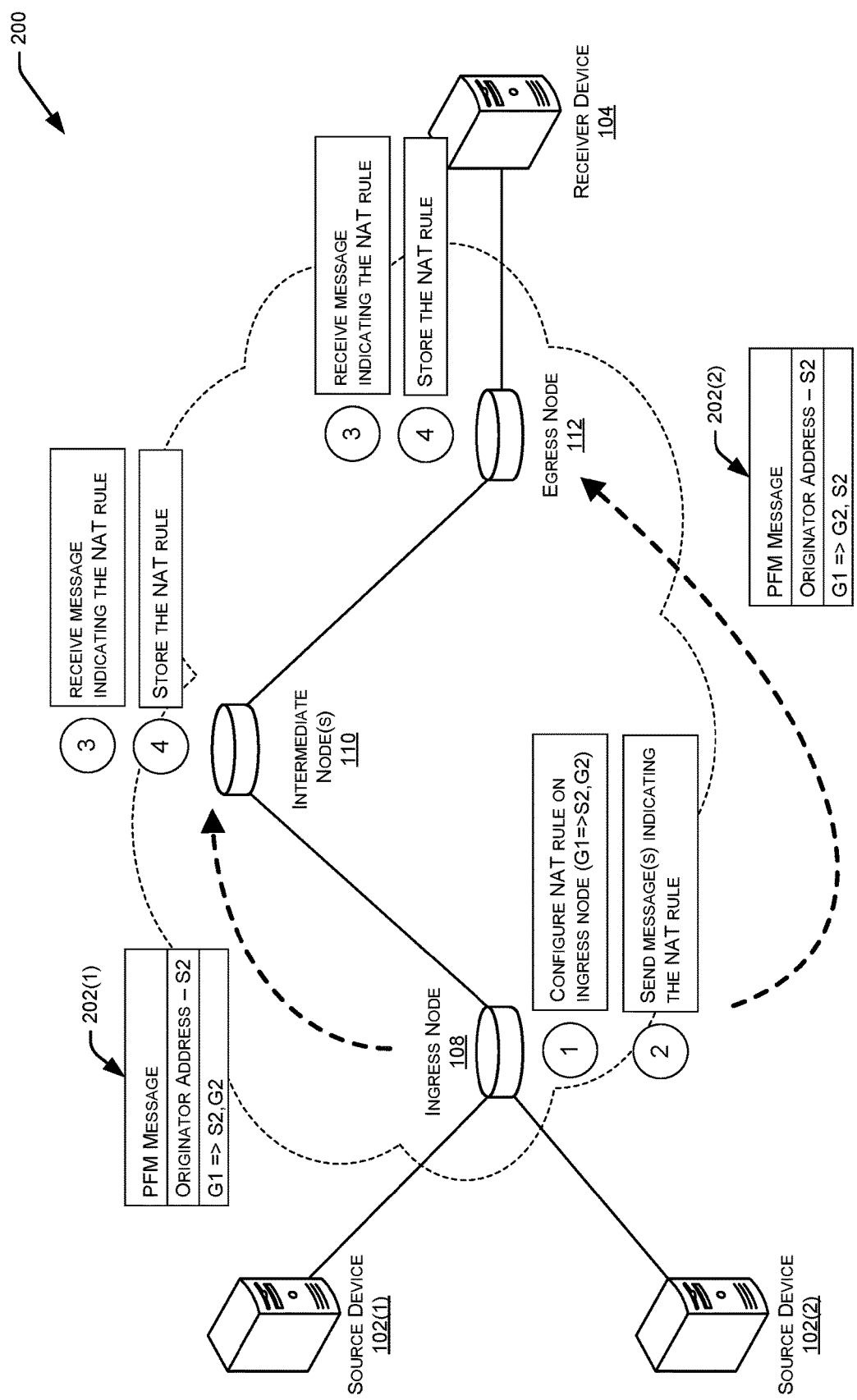
FIGS. 2A-B collectively illustrate a sequence of operations in which a NAT rule is configured on an ingress node, which sends respective PFM messages to other nodes in the fabric. The other nodes, including an example egress node, receives a respective PFM message, stores the NAT rule, and, in response to receiving a join request, use the NAT rule to determine the appropriate amount of bandwidth to reserve in response to the join request.
Figure 2B:
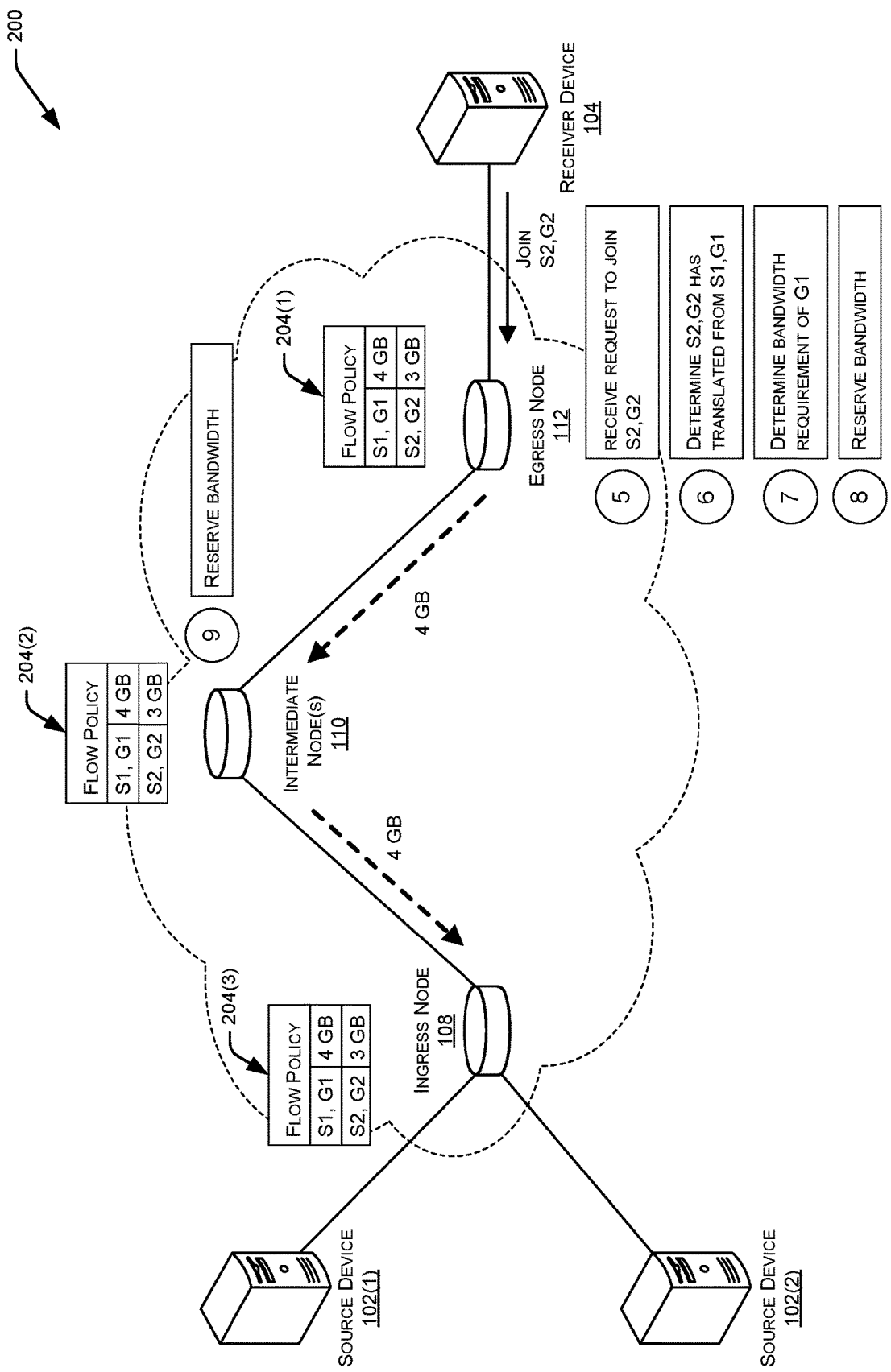

FIGS. 2A-B collectively illustrate a sequence of operations 200 in which a NAT rule is configured on an ingress node, which sends respective PFM messages to other nodes in the fabric. The other nodes, including an example egress node, receives a respective PFM message, stores the NAT rule, and, in response to receiving a join request, use the NAT rule to determine the appropriate amount of bandwidth to reserve in response to the join request.

At an operation "1", an example NAT rule is configured on a node within the fabric. In this example, the NAT rule is configured on the ingress node 108, with the NAT rule indicating that traffic from a first group, G1, is to be translated into traffic from a second group, S2, G2. At "2", the egress node 108 generates a message indicating this NAT rule and sends this message to one or more downstream nodes in the networking fabric 106.

For example, FIG. 2A indicates that the egress node may generate and send a first message 202(1) to the intermediate node 110 and a second message 202(2) to the egress node 112. In some instances, these messages 202 comprise respective PFM messages that indicate the NAT rule using a TLV of the PFM message.

At "3", each downstream node may receive the message, such as the PFM message. At "4", each downstream node may store the NAT rule, such as in a respective NAT-rules datastore 126 of the respective node. For example, FIG. 2A illustrates each intermediate node and the egress node storing an indication of this NAT rule received via the respective message 202.

FIG. 2B continues the illustration of the sequence of operations 200 and includes, at "5", the egress node 112 receiving a request to join a multicast group. In this example, the example receiver device 104 requests to join S2, G2. At "6", the egress node 112 determines that traffic from S2, G2 is to be translated from traffic from S1, G1, as indicated by the message 202(2) received from the ingress node 108. For example, the egress node 112 may determine this by analyzing the NAT rule stored in the instance of the NAT-rules datastore 126 on the egress node 112.

At "7", the egress node 112 determines the bandwidth requirement associated with G1. That is, rather than determine the amount of bandwidth required by G2 (the group associated with the join request), the bandwidth-reservation component 122 executing on the egress node 112 may determine the bandwidth required by the group, G1, from which the traffic is to be translated. Thus, in this example, the bandwidth-reservation component 122 may analyze the flow-policy table stored in the datastore 128 of the egress node 112 to determine that G1 is associated with a bandwidth of 4 GB/s.

At "8", the bandwidth-reservation component executing on the egress node 112 may attempt to reserve a bandwidth at least equal to the required bandwidth of G1 (here, 4 GB/s) on a link between the egress node 112 and the upstream intermediate node 110. It is to be appreciated that because the bandwidth required by G1 is greater than G2, reserving the greater bandwidth associated with G1 (rather than 3 GB/s required by G2), oversubscription of the link between the egress node 112 and the intermediate node 110 may be avoided.

At "9", the intermediate node may similarly identify the request to join G2 and reserve the appropriate bandwidth. That is, the intermediate node 110 may determine that traffic from S2, G2 is to be translated from traffic from S1, G1, as indicated by the message 202(1) received from the ingress node 108. For example, the intermediate node 110 may determine this by analyzing the NAT rule stored in the instance of the NAT-rules datastore 126 on the intermediate node 110. The intermediate node 110 thus determines the bandwidth requirement associated with G1, rather than the amount of bandwidth required by G2 (the group associated with the join request), from the flow-policy table stored in the datastore 128 of the intermediate node 110. Again, in this example, the intermediate node 110 determines that G1 is associated with a bandwidth of 4 GB/s and, thus, the bandwidth-reservation component executing on the intermediate node 110 attempts to reserve a bandwidth at least equal to the required bandwidth of G1 (here, 4 GB/s) on a link between the intermediate node 110 and the upstream ingress node 108. It is to be appreciated that because the bandwidth required by G1 is greater than G2, reserving the greater bandwidth associated with G1 (rather than 3 GB/s required by G2), oversubscription of the link between these two nodes may be avoided.

Figure 3A:
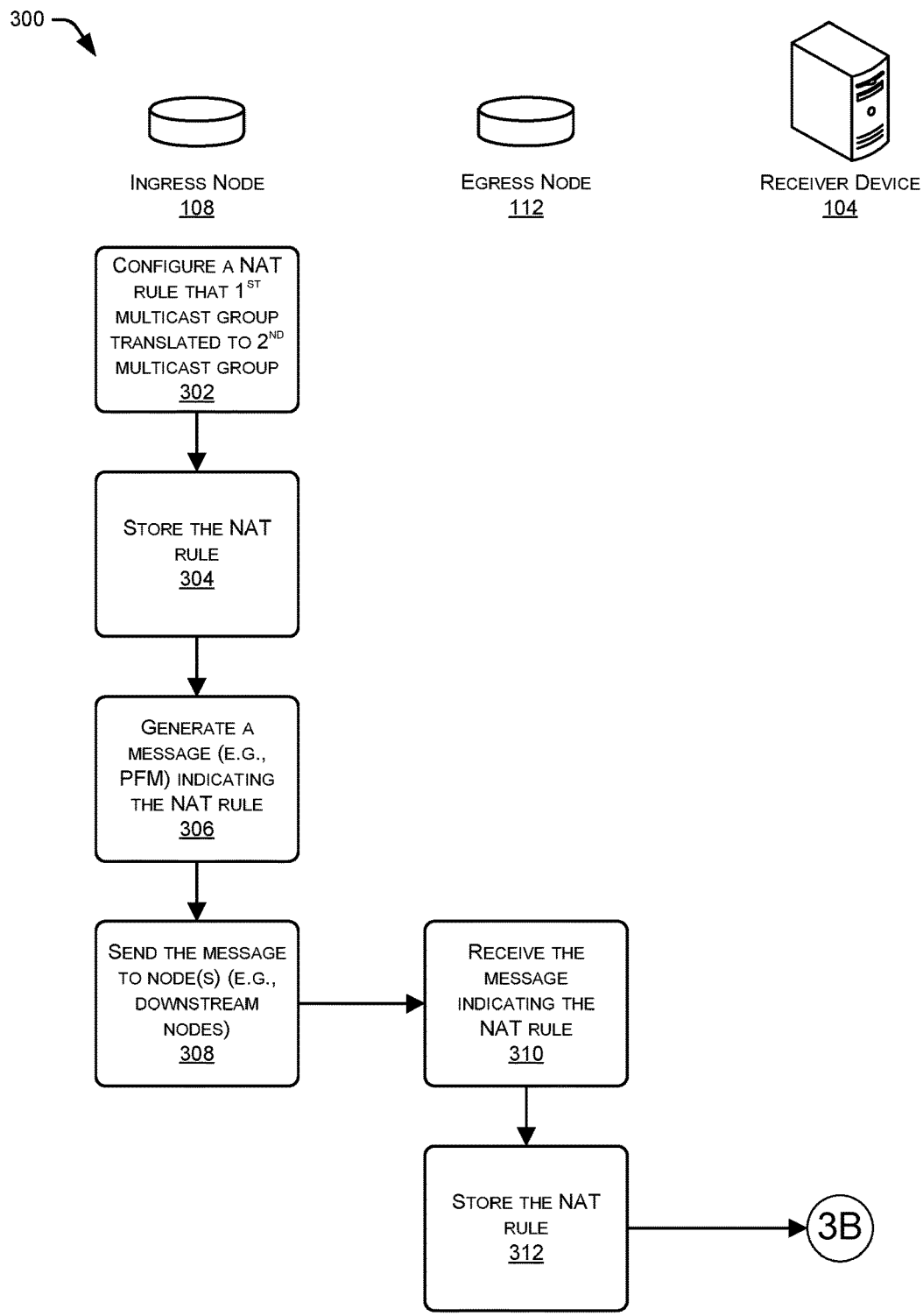
FIGS. 3A-B collectively illustrate an example process of conveying information regarding a NAT rule using the techniques described herein.
Figure 3B:
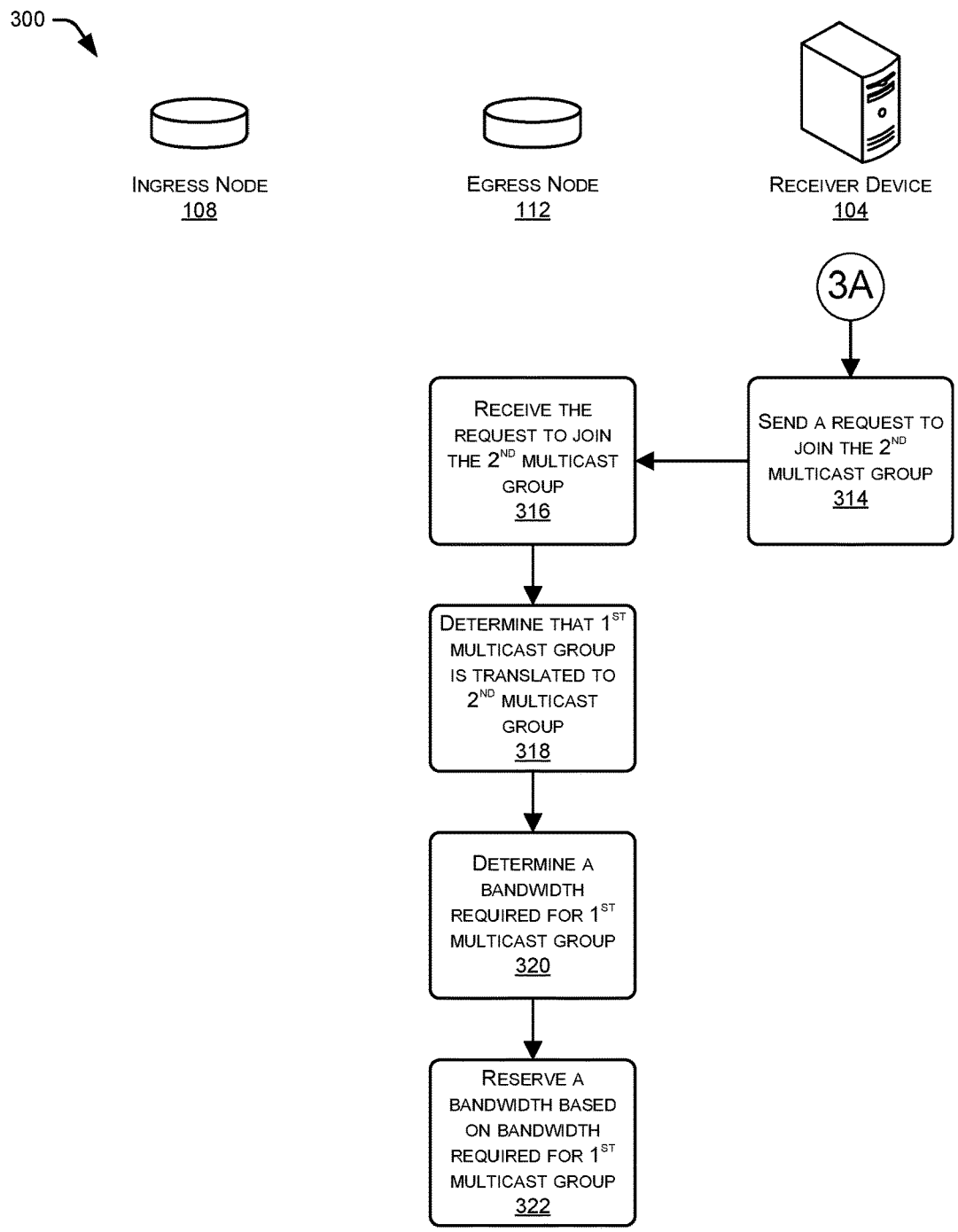

FIGS. 3A-B collectively illustrate an example process 300 of conveying information regarding a NAT rule using the techniques described herein. An operation 302 represents configuring, on a networking device such as the ingress node 108, a NAT rule indicating that a first multicast group is to be translated to a second multicast group. An operation 304 represents the ingress node 108 storing the NAT rule and, at an operation 306, generating a message, such as a PFM, indicating the NAT rule. At an operation 308, the ingress node 108 sends the message to one or more nodes in the switched network, as such as to each downstream node.

At an operation 310, another networking device, such as the egress node 112, receives the message from the ingress node 108. An operation 312 represents the egress node 112 storing the NAT rule.

FIG. 3B continues the illustration of the process 300 and includes, at an operation 314, a receiver device 104 sending a request to join the second multicast group to the egress node 112. At an operation 316, the egress node 112 receives the request and, at an operation 318, determines, using the NAT rule, that the first multicast group is to be translated to the second multicast group. At an operation 320, the egress node 112 determines a bandwidth requirement associated with the first multicast group, rather than a bandwidth requirement associated with the second multicast group. At an operation 322, the egress node 112 reserves, on a link between the egress node 112 and an upstream node in the switched network to which the egress node 112 couples, an amount of bandwidth that is based at least in part on the bandwidth requirement associated with the first multicast group.

Figure 4:
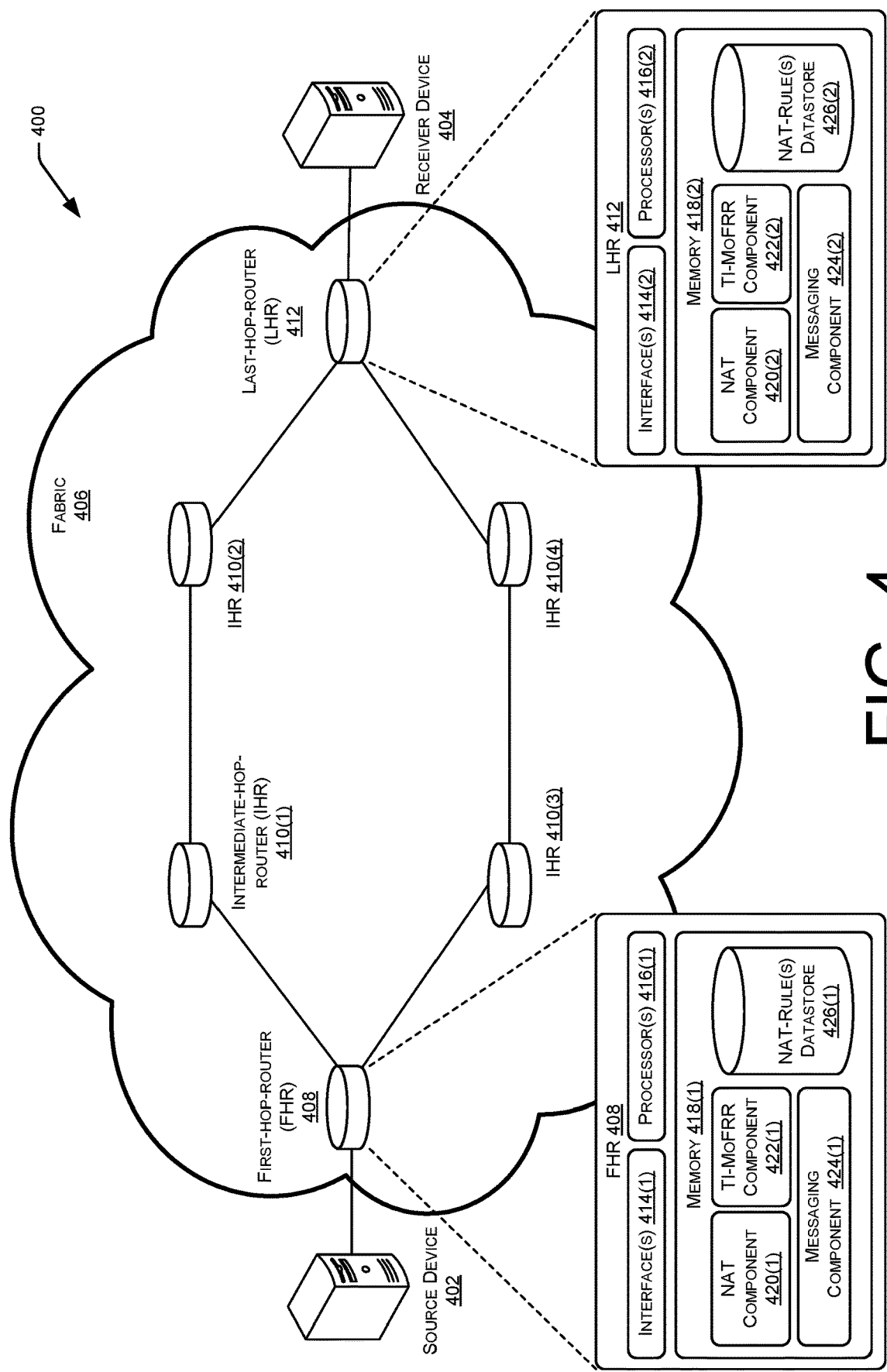
FIG. 4 illustrates another system-architecture diagram of another example environment in which a source device sends multicast traffic towards a receiver device via two different networking planes of a networking fabric. In some instances, a first-hop-router (FHR) is configured with a NAT rule that translates traffic from a source, S into traffic from a first source and group (e.g., S1, G1) and a second source and group (e.g., S2, G2). In response, the FHR may send messages to each other node in the fabric indicating the NAT rule such that a last-hop-router (LHR) may determine the NAT rule and translate one of the multicast streams back to the original S, G before forwarding it to a receiver device.

FIG. 4 illustrates another system-architecture diagram of another example environment 400 in which a source device 402 sends multicast traffic towards a receiver device 404 via two different networking planes of a networking fabric 406. In some instances, a first-hop-router (FHR) 408 is configured with a NAT rule that translates traffic from the source, S into traffic from a first source and group (e.g., S1, G1) and a second source and group (e.g., S2, G2). In response, the FHR 408 may send messages indicating the NAT rule to one or more intermediate-hop-routers (IHRs) 410(1), (2), (3) and (4) and/or to a last-hop-router (LHR) 412. The LHR 412 may use this message to determine the NAT rule and translate one of the multicast streams back to the original S, G before forwarding it to the receiver device 404.

As illustrated, the FHR includes one or more interfaces 414(1), one or more hardware process 416(1), and memory 418(1). The memory 418(1) may store a NAT component 420(1), a TI-MoFRR component 422(1), a messaging component 424(1), and a NAT-rules datastore 426(1). The LHR 412 may similarly include one or more interfaces 414(2), one or more hardware process 416(2), and memory 418(2). The memory 418(2) may store a NAT component 420(2), a TI-MoFRR component 422(2), a messaging component 424(2), and a NAT-rules datastore 426(2). Each instance of the components stored on the FHR and LHR may be configured to perform similar or the same techniques.

The NAT component 420(1) and (2), for instance, may enable configuration of one or more NAT rules on the respective node, such as the FHR or the LHR. For example, a NAT rule may be configured on the FHR indicating that traffic from the source 402 is to be duplicated and translated into traffic from a first source, S1, and traffic from a second source, S2. In addition, upon the NAT rule being configured on the FHR 408 and stored in the datastore 426(1), the messaging component 424(1) may be configured to generate and send a message indicating this NAT rule one or more nodes in the networking fabric 406, such as to each of the IHRs 410 and the LHR 412. In some instances, the messaging component 424(1) generates and sends respective instances of a PFM message indicating the configured NAT rule. The NAT component 420(1) on the LHR 412 may receive the PFM or other message and store the NAT rule in the datastore 426(2).

Thereafter, the source device 404 may begin sending traffic associated with S, G to the FHR 408. Upon receiving this traffic, the FHR 408 may duplicate the traffic and translate the traffic into traffic from a first source, S1, and traffic from a second source, S2. The FHR 408 may then begin sending traffic from the first source, S1, along a first networking plane (e.g., comprising IHRs 410(1)-(2)) and traffic from the second source, S2, along a second networking plane (e.g., comprising IHRs 410(3)-(4)). In some instances, the architecture creates a redundant fabric in that the first networking plane does not share in common any nodes of the second networking plane.

The IHRs, meanwhile, may receive the respective traffic and send it along to the respective downstream node. For example, the IHR 410(1) may receive the traffic from the first source, S1, and may send it to the IHR 410(2), which may in turn receive the traffic and send it to the LHR 412. The 410(3), meanwhile, may receive the traffic from the second source, S2, and may send it to the IHR 410(4), which may in turn receive the traffic and send it to the LHR 412. The LHR 412 may thus receive both the traffic from the first source and the traffic from the second source, assuming that there was no failure in the fabric 406.

Further, the TI-MoFRR component 422(2) on the LHR 412 may be configured to determine, from the NAT rule stored in the datastore 426(2), that the traffic from the first source, S1, and the traffic from the second source, S2, has been translated from the original source, S. That is, the TI-MoFRR component 422(2) may determine that each of S1, G and S2, G correspond to the S, G to which the receiver device 404 previously subscribed. Thus, the TI-MoFRR component 422(2) may select one of the streams of traffic (S1 or S2) as the primary stream and may translate this traffic back to the original source, S, before forwarding along the traffic to the receiver device 404. Further, if a disruption occurs in the selected stream, the TI-MoFRR component 422(2) may translate the other, non-selected stream back to the original source, S, and may begin sending this traffic to the source device 404. Thus, the techniques may enable TI-MoFRR without requiring manual configuration of each device in the fabric 406.

Figure 5A:
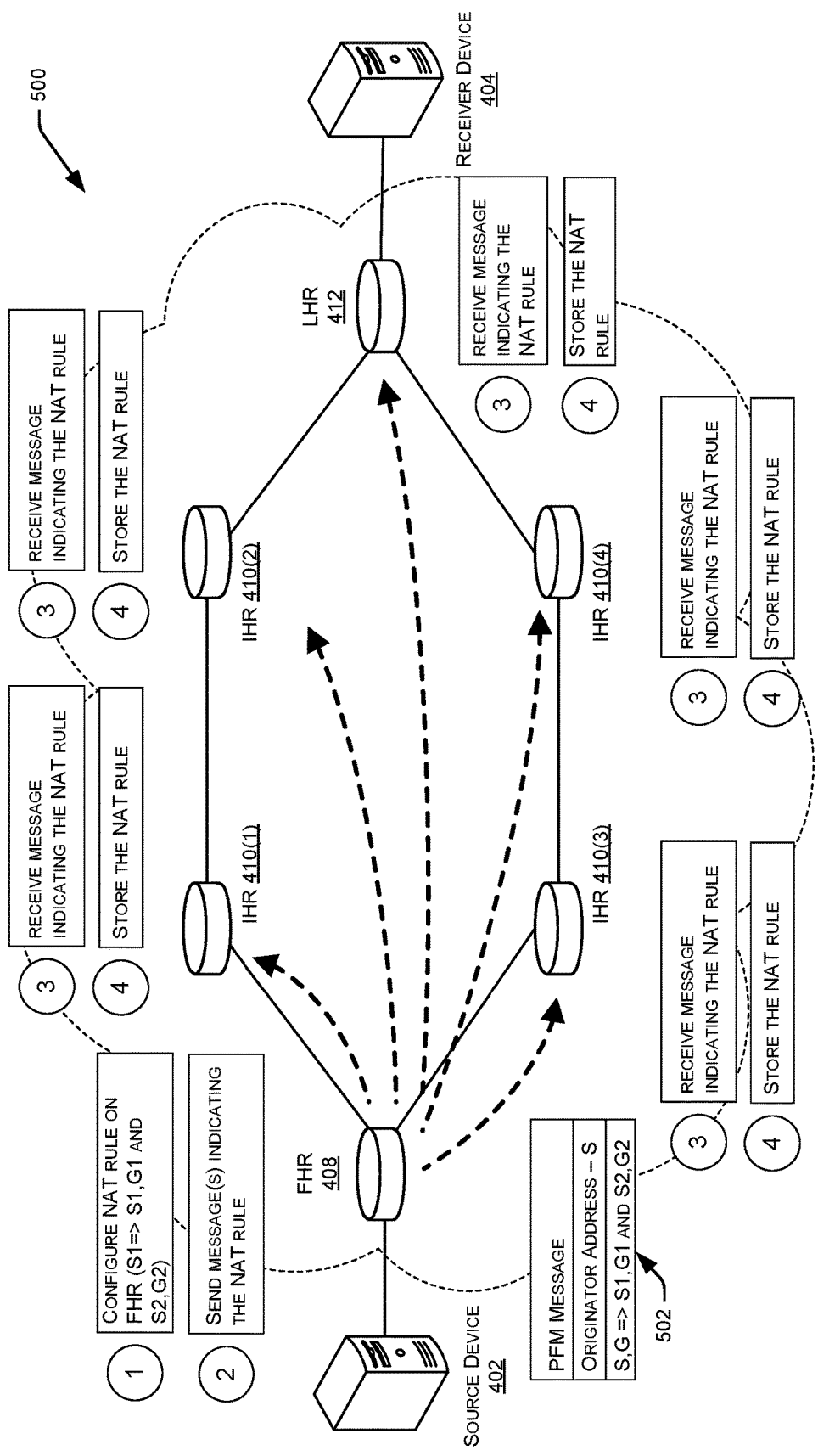
FIGS. 5A-B collectively illustrate a sequence of operations in which a NAT rule is configured on an FHR, which sends respective PFM messages to other nodes in the fabric. The other nodes, including an example LHR, receives a respective PFM message, stores the NAT rule, and uses the NAT rule to translate traffic from S1 or S2 back into traffic from the original source, S, before sending it along to a receiver device.
Figure 5B:
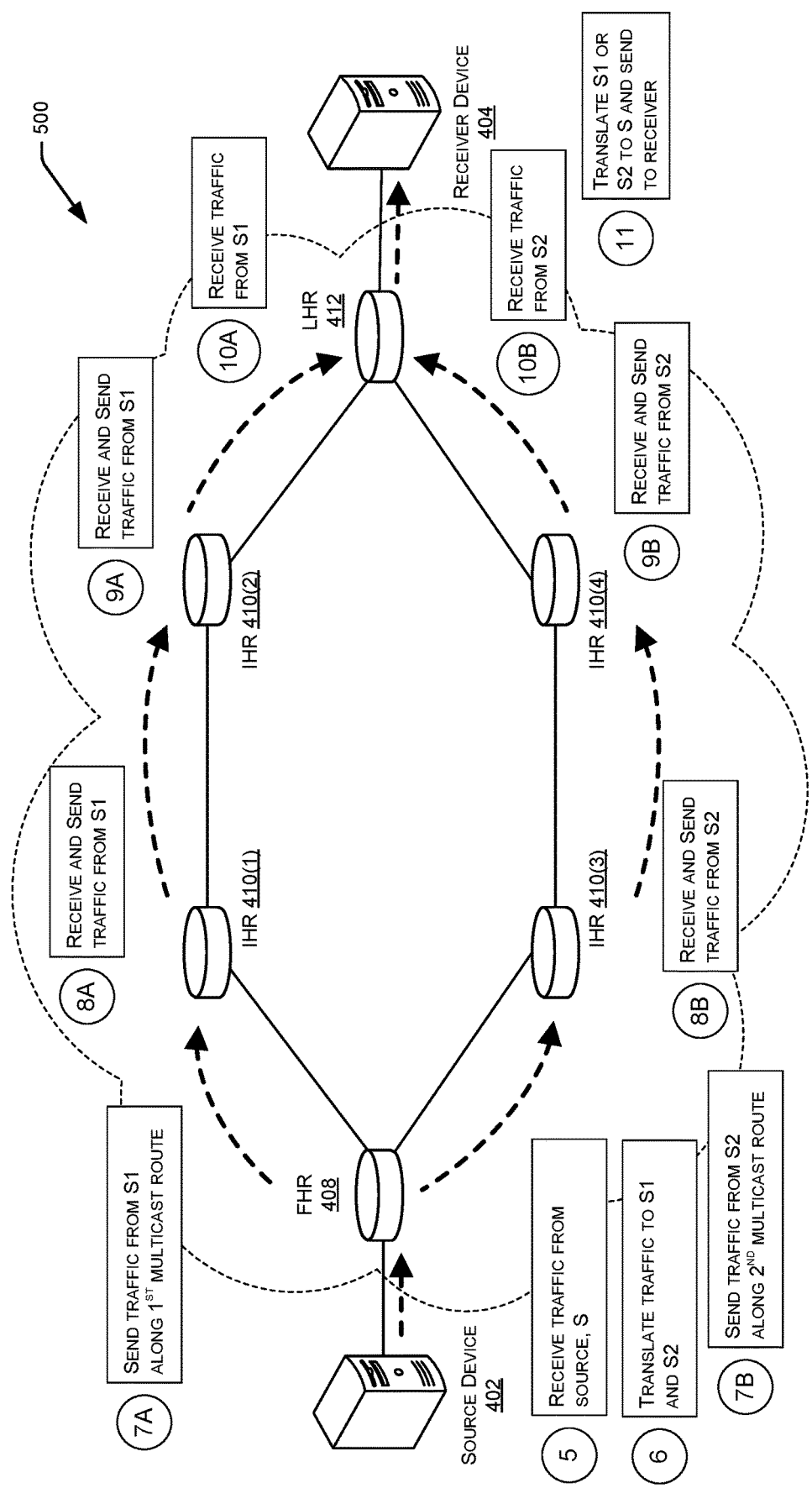

FIGS. 5A-B collectively illustrate a sequence of operations 500 in which a NAT rule is configured on the FHR 408, which sends respective PFM messages to other nodes in the fabric. The other nodes, including the example LHR 412, receives a respective PFM message, stores the NAT rule, and uses the NAT rule to translate traffic from S1 or S2 back into traffic from the original source, S, before sending it along to the example receiver device 404.

For example, at "1", a NAT rule is configured on the FHR 408. This example NAT rule indicates that traffic from the source device 402 is to be duplicated and translated to traffic from a first source, S1, and a second source, S2. At "2", and in response to the NAT rule being configured on the FHR 408, the FHR 408 generates and sends one or more messages 502 indicating the NAT rule to one or more downstream nodes. For example, the FHR 408 may generate a PFM message indicating that traffic from source, S, is to be translated into S1, G1 and S2, G2. The FHR 408 may send an instance of this example message 502 to each of the IHRs 410(1)-(4) and to the LHR 412. At "3", each respective downstream node receives the instance of the message 502 and, at "4", stores the NAT rule indicated by the message in a respective NAT-rules datastore 426.

FIG. 5B continues the illustration and includes, at "5", the FHR 408 receiving traffic from the source device (S) 402. At "6", the FHR 408 duplicates and translates the traffic into S1, G1 traffic and S2, G2 traffic, in accordance with the NAT rule configured on the FHR 408. At "7A", the FHR 408 sends the S1, G1 traffic towards the LHR 412 in the first networking plane. For example, the FHR 408 sends the traffic from the first source, S1, to the IHR 410(1). At "7B", the FHR 408 sends the S2, G2 traffic towards the LHR 412 in the second networking plane. For example, the FHR 408 sends the traffic from the first source, S1, to the IHR 410(3). At "8A" the IHR 410(1) receives the S1, G1 traffic from the FHR 408 and sends it along to the IHR 410(2), which receives this traffic and sends it along to the LHR 412 at "9A". At "8B" the IHR 410(3) receives the S2, G2 traffic from the FHR 408 and sends it along to the IHR 410(4), which receives this traffic and sends it along to the LHR 412 at "9B".

At "10A", the LHR 412 receives the S1, G1 traffic from the first networking plane, while at "10B" the LHR 412 receives the S2, G2 traffic from the second networking plane. At "11", the LHR 412 picks one of the S1, G1 or S2, G2 traffic as the primary stream, translates this traffic back to S, G, and sends this traffic to the receiver device 404.

Figure 6A:
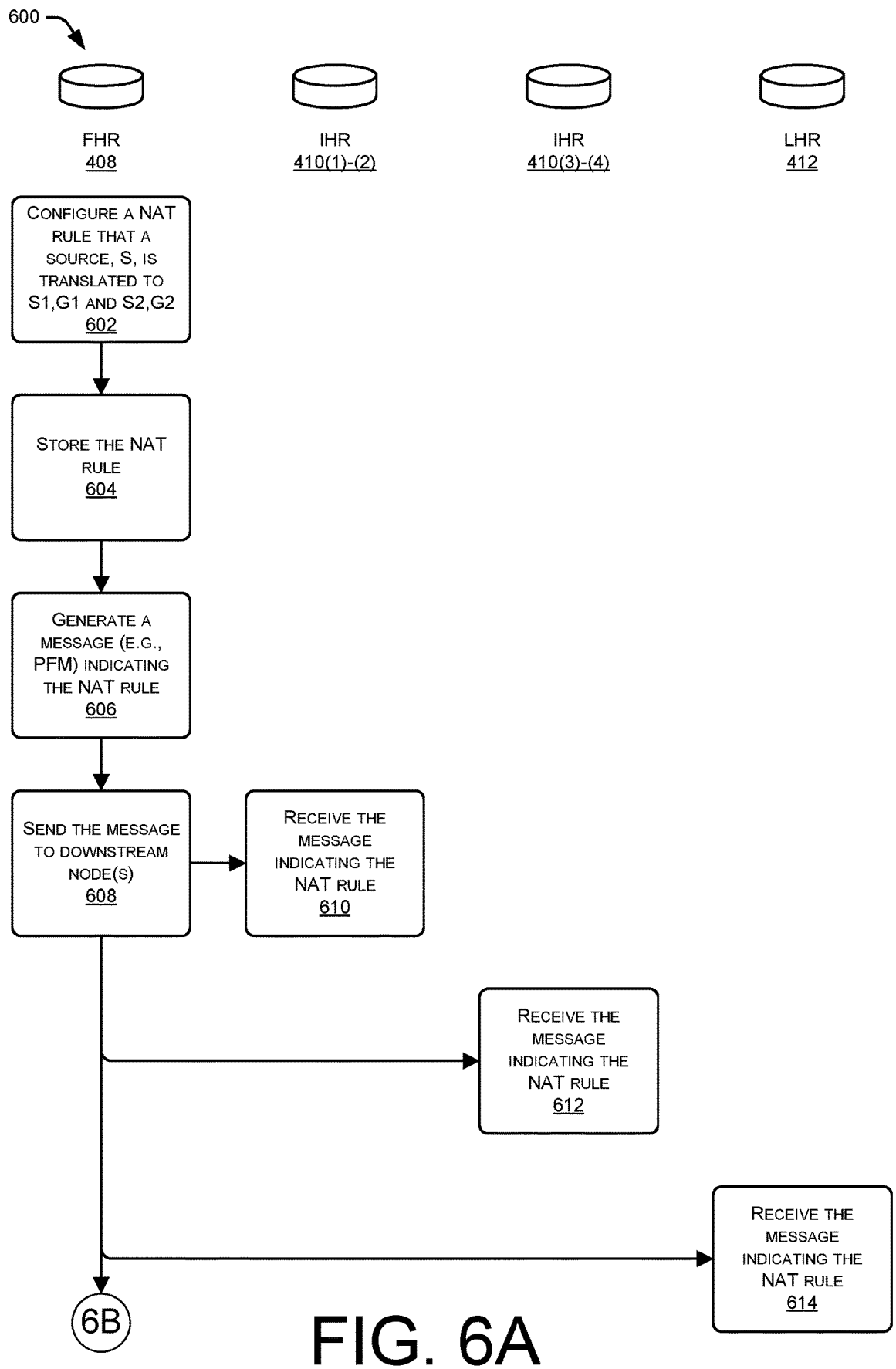
FIGS. 6A-B collectively illustrate another example process of conveying information regarding a NAT rule using the techniques described herein.
Figure 6B:
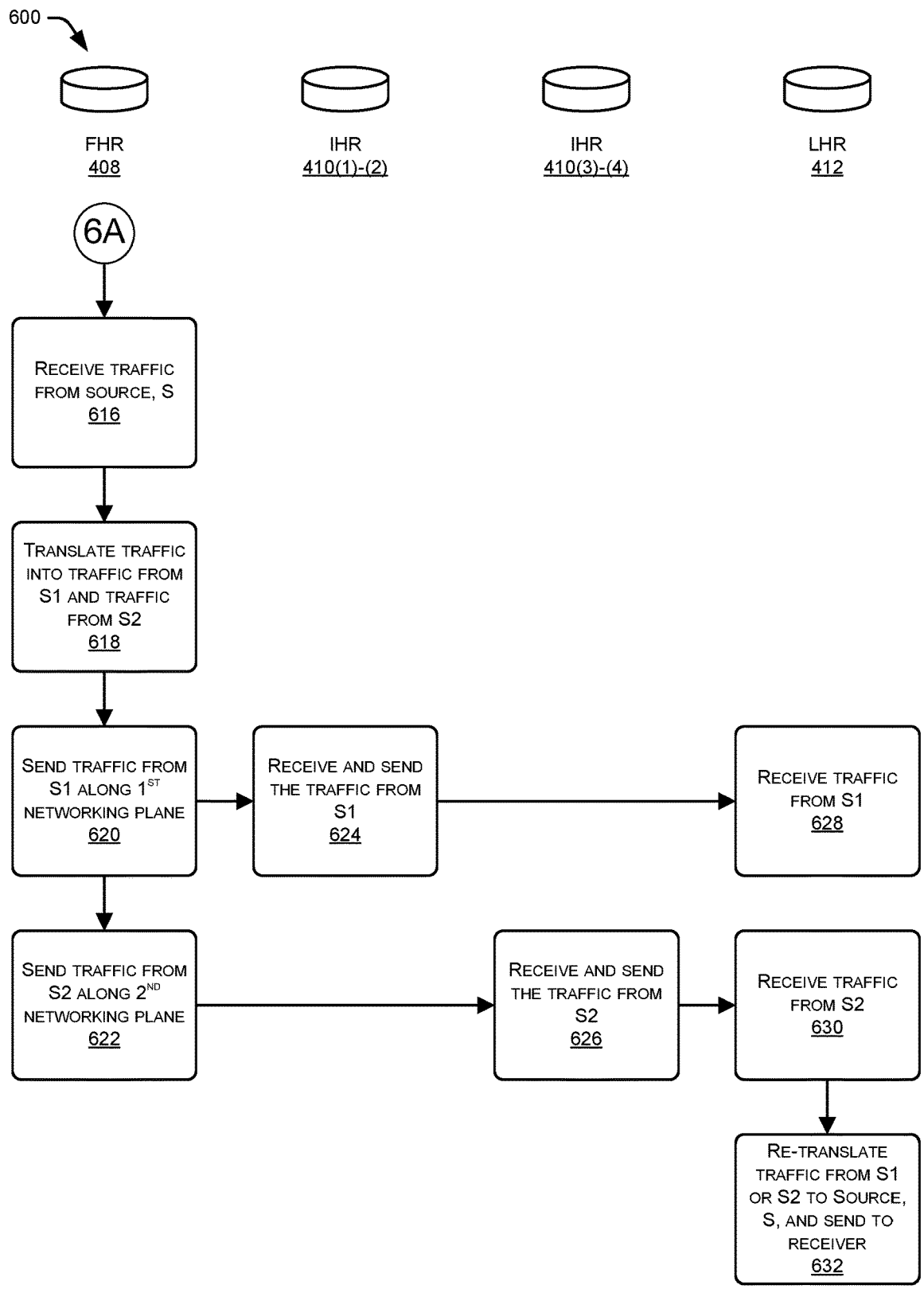

FIGS. 6A-B collectively illustrate another example process 600 of conveying information regarding a NAT rule using the techniques described herein. An operation 602 represents configuring, on the FHR 408, a NAT rule indicating that a source of a multicast group is to be translated to first source and to a second source. At an operation 604, the FHR 408 stores the NAT rule and, at an operation 606, generates a message indicating the NAT rule at least partly in response to the configuring of the NAT rule. In some instances, this message may comprise a PFM message that indicates the NAT rule via TLV of the NAT rule.

At an operation 608, the FHR 408 sends the message to one or more downstream nodes, such as at least to the IHR 410(1) in a first multicast route (or networking plane) and to the IHR 410(3) in a second multicast route (or networking plane). In some instances, the FHR 408 may send an instance of the message to each device in the first multicast route (e.g., IHRs 410(1) and (2)), each device in the second multicast route (e.g., IHRs 410(3) and (4)) and the LHR 412. An operation 610 represents receiving the message in the first multicast route or networking plane (e.g., at the IHR 410(1)), while an operation 612 represents receiving the message in the second multicast route or networking plane (e.g., at the IHR 410(3)). An operation 614, meanwhile, represents receiving the message at the LHR 412.

FIG. 6B continues the illustration of the process 600 and includes, at an operation 616, the FHR 408 receiving traffic from the source device 402. At an operation 618, the FHR 408 translates the traffic from the source into traffic from the first source and traffic from the second source. At an operation 620, the FHR 408 sends the traffic from the first source along the first networking plane (e.g., to the IHR 410(1), while an operation 622 represents sending the traffic from the second source along the second networking plane (e.g., to the IHR 410(3)). An operation 624 represents IHRs of the first networking plane receiving the traffic from the first source and sending it along to the LHR 412, while an operation 626 represents IHRs of the second networking plane receiving the traffic from the second source and sending it along to the LHR 412.

At an operation 628, the LHR 412 receives the traffic from the first source and, at an operation 630, receives the traffic from the second source. At an operation 632, the LHR 412 selects one of these streams and re-translates the traffic from the first source or the traffic from the second source back into traffic from the original source, S, before sending along this re-translated traffic to the receiver device 404. As described above, the secondary stream may be used by the LHR 412 in the event that traffic disruption occurs in the selected, re-translated stream.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2A-6B, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7:
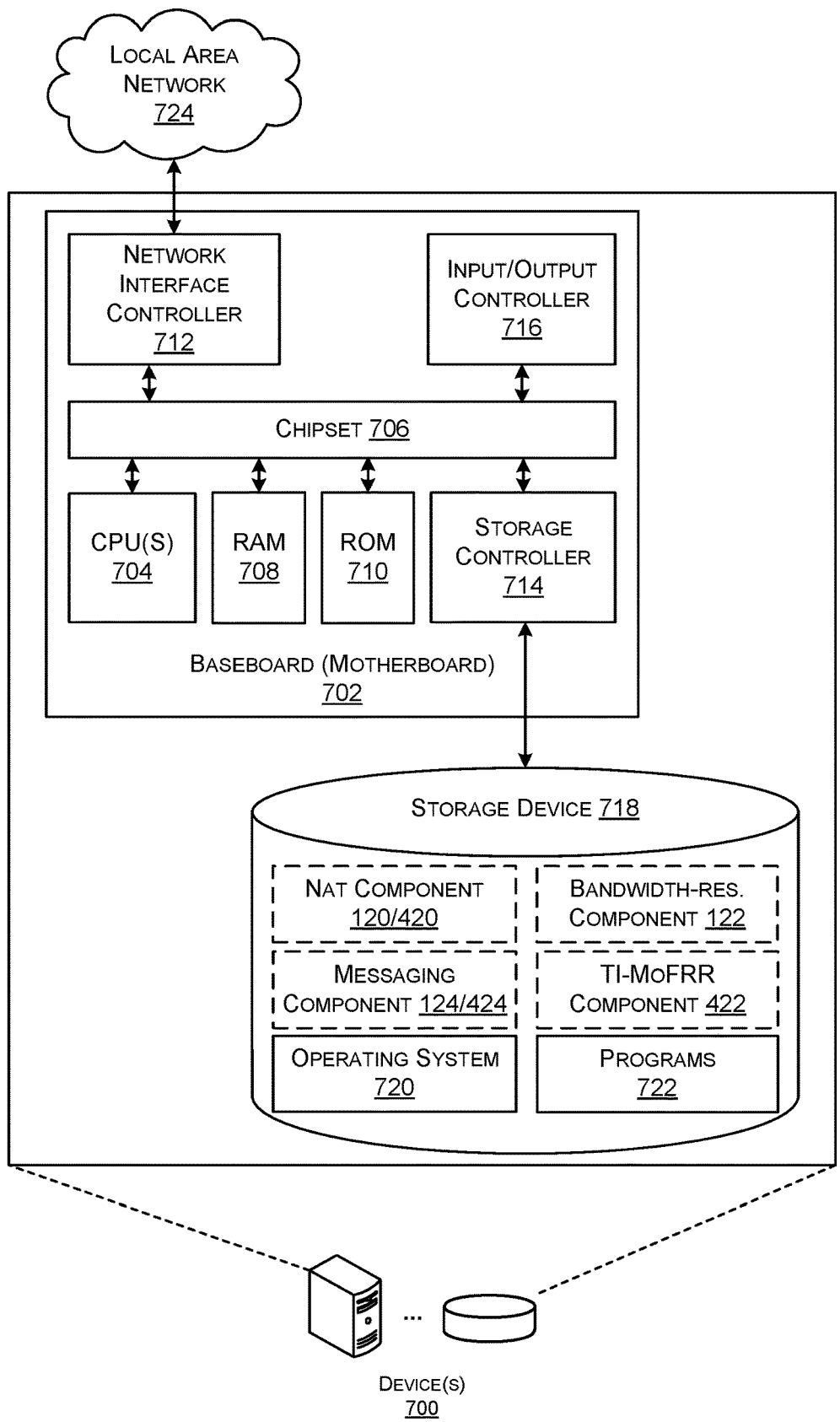
FIG. 7 is a computer architecture diagram showing an illustrative computer hardware architecture for implementing computing devices configured to implement the techniques described herein.

FIG. 7 is a computer architecture diagram showing an illustrative computer hardware architecture for implementing a device 700 that can be utilized to implement various aspects of the various technologies presented herein. The source devices 102/402, the receiver devices 104/404, and/or nodes 108-112/408-412 of the fabrics 106 and 406, discussed above, may include some or all of the components discussed below with reference to the device 700.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the devices 700 can also be configured to execute a resource manager capable of instantiating and/or managing the computing resources. In the case of VM instances, for example, the resource manager can be a hypervisor or another type of program configured to enable the execution of multiple VM instances on a single server device 700. Devices 700 in a data center can also be configured to provide network services and other types of services.

The device 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the device 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the device 700. The chipset 706 can further provide an interface to a computer-readable storage medium such as a read-only memory (ROM) 710 or non-volatile RAM (NVRAM) for storing basic routines that help to startup the device 700 and to transfer information between the various components and devices. The ROM 710 or NVRAM can also store other software components necessary for the operation of the device 700 in accordance with the configurations described herein.

The device 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the device 700 to other computing devices over the network. It should be appreciated that multiple NICs 712 can be present in the device 700, connecting the computer to other types of networks and remote computer systems.

The device 700 can be connected to a storage device 718 that provides non-volatile storage for the computer. The storage device 718 can store an operating system 720, programs 722, and data, which have been described in greater detail herein. The storage device 718 can be connected to the device 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The device 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the device 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 700 can further read information from the storage device 718 by detecting the physical states or characteristics of one or more particular locations within the physical storage units.

In addition to the mass storage device 718 described above, the device 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the device 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the device 700.

In one embodiment, the storage device 718 or other computer-readable storage media is encoded with computer-executable instructions which, when loaded into the device 700, transform the computer from a general-purpose computing system into a special-purpose computer capable of implementing the embodiments described herein. These computer-executable instructions transform the device 700 by specifying how the CPUs 704 transition between states, as described above. According to one embodiment, the device 700 has access to computer-readable storage media storing computer-executable instructions which, when executed by the device 700, perform the various processes described above with regard to FIGS. 2A-3D. The device 700 can also include computer-readable storage media having instructions stored thereupon for performing any of the other computer-implemented operations described herein.

The device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the device 700 might not include all of the components shown in FIG. 5, can include other components that are not explicitly shown in FIG. 5, or might utilize an architecture completely different than that shown in FIG. 5.

The device 700 may also store, in the storage device 718, the NAT components 120/420, the bandwidth-reservation component 122, the messaging components 122/422, the TI-MoFRR component 422, and/or the datastores described above for performing some or all of the techniques described above with reference to FIGS. 1-6B.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A first networking device associated with a switched network, the first networking device comprising:
   one or more processors; and
   one or more computer-readable media storing computer-executable instructions that, when executed, cause the one or more processors to perform acts comprising:
      configuring, on the first networking device, a network-address-translation (NAT) rule indicating that a first multicast group is to be translated to a second multicast group;
      at least partly in response to the configuring of the NAT rule:
         storing the NAT rule at the first networking device;
         generating a message that includes information indicating whether multicast traffic received downstream from the first networking device has been translated using the NAT rule; and
         sending the message to at least a second networking device associated with the switched network, wherein the second networking device is downstream from the first networking device in the switched network.

2. The first networking device as recited in claim 1, wherein the generating the message comprises generating a protocol-independent-multicast-flooding-mechanism (PFM) message.

3. The first networking device as recited in claim 1, wherein:
   the generating the message comprises generating a protocol-independent-multicast-flooding-mechanism (PFM) message; and
   the sending comprises sending the PFM message to multiple downstream networking devices in the switched network, the multiple downstream networking devices including the second networking device.

4. The first networking device as recited in claim 1, wherein the generating comprises generating a protocol-independent-multicast-flooding-mechanism (PFM) message, the PFM message including a type-length-value (TLV) indicating the NAT rule.

5. The first networking device as recited in claim 1, wherein the NAT rule comprises a first NAT rule, and the acts further comprise:
   receiving, from a third networking device associated with the switched network, an indication of a second NAT rule indicating that a third multicast group is to be translated to a fourth multicast group;
   storing the second NAT rule at the first networking device;
   receiving, from a fourth device, a request to join the fourth multicast group;
   determining, using the second NAT rule, that the third multicast group is to be translated to the fourth multicast group; and
   determining a bandwidth requirement associated with the third multicast group.

6. The first networking device as recited in claim 5, the acts further comprising reserving, on a link between the first networking device and a fifth networking device to which the first networking device couples, an amount of bandwidth that is based at least in part on the bandwidth requirement associated with the third multicast group.

7. A method comprising:
receiving, at a first device in a switched network, an indication of a network-address-translation (NAT) rule indicating that a first multicast group is to be translated to a second multicast group;
storing the NAT rule at the first device;
receiving, from a second device, a request to join the second multicast group, wherein the second device is downstream from the first device in the switched network;
determining, using the NAT rule, that the first multicast group is to be translated to the second multicast group;
generating a message that includes information indicating whether multicast traffic received downstream from the first device has been translated using the NAT rule;
sending the message from the first device and to the second device; and
determining a bandwidth requirement associated with the first multicast group.

8. The method as recited in claim 7, further comprising reserving, on a link between the first device and a third device in the switched network to which the first device couples, an amount of bandwidth that is based at least in part on the bandwidth requirement associated with the first multicast group.

9. The method as recited in claim 7, wherein the receiving the indication of the NAT rule comprises receiving a protocol-independent-multicast-flooding-mechanism (PFM) message.

10. The method as recited in claim 7, wherein the receiving the indication of the NAT rule comprises receiving a protocol-independent-multicast-flooding-mechanism (PFM) message from a third device in the switched network on which the NAT rule was configured.

11. The method as recited in claim 7, wherein the receiving the indication of the NAT rule comprises receiving a protocol-independent-multicast-flooding-mechanism (PFM) message, the PFM message specifying the message using a type-length-value (TLV) of the PFM message.

12. The method as recited in claim 7, further comprising:
configuring the NAT rule on a third device of the switched network; and
generating, by the third device and at least partly in response to the configuring, the indication of the NAT rule; and
sending the indication of the NAT rule to first device.

13. The method as recited in claim 12, wherein:
the generating the indication of the NAT rule comprises generating a protocol-independent-multicast-flooding-mechanism (PFM) message; and
the sending the indication comprises sending the PFM message to the first device.

14. A method comprising:
configuring, on a first-hop-router (FHR) of a switched network, a network-address-translation (NAT) rule indicating that a source of a multicast group is to be translated to a first source and to a second source;
storing the NAT rule on the FHR;
generating, by the FHR and at least partly in response to the configuring, a message that includes information indicating whether multicast traffic received downstream from the FHR has been translated using the NAT rule; and
sending the message to at least: (i) a first device coupled to the FHR and associated with a first multicast route toward a receiver, and (ii) a second device coupled to the FHR and associated with a second multicast route toward the receiver.

15. The method as recited in claim 14, further comprising:
receiving traffic from the source;
translating the traffic from the source into traffic from the first source and traffic from the second source; and
sending the traffic from the first source to the first device and traffic from the second source to the second device.

16. The method as recited in claim 14, wherein the first multicast route does not include common devices in the switched network with the second multicast route.

17. The method as recited in claim 14, wherein the sending comprising sending the message to each device in the first multicast route toward the receiver, to each device in the second multicast route toward the receiver, and to a last-hop-router (LHR) that couples to the receiver.

18. The method as recited in claim 14, wherein the generating the message comprises generating a protocol-independent-multicast-flooding-mechanism (PFM) message that includes a type-length-value (TLV) indicating the NAT rule.

19. The method as recited in claim 14, further comprising:
receiving the message at a last-hop-router (LHR) that couples to the receiver;
receiving, at the LHR, traffic from the first source;
receiving, at the LHR, traffic from the second source; and
translating at least one of the traffic from the first source or the traffic from the second source into traffic from the source.

20. The method as recited in claim 14, further comprising:
receiving, at the first device, the message that includes information indicating whether multicast traffic received downstream from the FHR has been translated using the NAT rule; and
generating, at the first device, the message indicating the NAT rule; and
sending the message to the second device associated with the switched network.

* * * * *